US008050242B2

(12) United States Patent
Lipford et al.

(10) Patent No.: US 8,050,242 B2
(45) Date of Patent: Nov. 1, 2011

(54) METHOD AND SYSTEM FOR TAILORING DEVICE PROVISIONING BASED ON DEVICE CAPABILITY INFORMATION COMMUNICATED TO NETWORK

(75) Inventors: Mark A. Lipford, Leawood, KS (US); Serge M. Manning, Overland Park, KS (US); David S. McGinniss, Naperville, IL (US)

(73) Assignee: Clear Wireless LLC, Kirkland, WA (US)

( * ) Notice: Subject to any disclaimer, the term of this patent is extended or adjusted under 35 U.S.C. 154(b) by 874 days.

(21) Appl. No.: 11/680,714

(22) Filed: Mar. 1, 2007

(65) Prior Publication Data

US 2008/0212503 A1 Sep. 4, 2008

(51) Int. Cl.
*H04W 4/00* (2009.01)
*H04M 3/00* (2006.01)
(52) U.S. Cl. ....... 370/338; 370/310; 455/418; 455/41.1; 455/450
(58) Field of Classification Search .......... 455/418–419, 455/550.1, 414.1, 410–411; 370/338, 310; 709/220–222
See application file for complete search history.

(56) References Cited

U.S. PATENT DOCUMENTS

| 6,549,770 | B1 | 4/2003 | Marran |
| 6,892,228 | B1 | 5/2005 | Penders |
| 6,963,635 | B1 | 11/2005 | Jones |
| 7,143,149 | B2 | 11/2006 | Oberg et al. |
| 7,260,382 | B1 | 8/2007 | Lamb et al. |
| 7,487,233 | B2 | 2/2009 | Iwamoto et al. |
| 2003/0096621 | A1 | 5/2003 | Jana et al. |
| 2003/0134614 | A1 | 7/2003 | Dye |
| 2003/0181223 | A1 | 9/2003 | Lee et al. |
| 2004/0148343 | A1 | 7/2004 | Mottes |
| 2004/0162058 | A1 | 8/2004 | Mottes |
| 2005/0079863 | A1 | 4/2005 | Macaluso |
| 2005/0080875 | A1 | 4/2005 | Jethi et al. |

(Continued)

FOREIGN PATENT DOCUMENTS

EP 1 705 872 A1 9/2006

(Continued)

OTHER PUBLICATIONS

OMA Device Management: Management Object for DMAcc for DM 1.2, Version 1.0; Nov. 28, 2008, p. 9.*

(Continued)

*Primary Examiner* — Lester Kincaid
*Assistant Examiner* — Daniel Lai
(74) *Attorney, Agent, or Firm* — McDonnell Boehnen Hulbert & Berghoff LLP

(57) ABSTRACT

Before a WiMAX-equipped device is distributed to an end-user, the manufacturer or distributor of the WiMAX-equipped device will record in the device a set of data that describes characteristics (e.g., type, features, capabilities, and limitations) of the device. When the end-user powers on the device or otherwise brings the device within the coverage of a service provider's WiMAX base station, the device will then acquire radio connectivity, typically with the service provider authenticating the device's WiMAX chipset. Thereafter, the device will engage in a first-time activation/service-provisioning session with a system operated by the service provider, and during that session, the device will provide the system with its device-characteristics data and the service provider will use that device-characteristics data as a basis to customize provisioning of service for the device based on the device's features and capabilities.

16 Claims, 5 Drawing Sheets

U.S. PATENT DOCUMENTS

| | | | |
|---|---|---|---|
| 2005/0114534 A1 | 5/2005 | Lee | |
| 2005/0229001 A1 | 10/2005 | Brown et al. | |
| 2006/0030315 A1 | 2/2006 | Smith et al. | |
| 2006/0035631 A1 | 2/2006 | White et al. | |
| 2006/0116125 A1* | 6/2006 | Buckley et al. | 455/435.1 |
| 2006/0116507 A1 | 6/2006 | Oppermann et al. | |
| 2006/0184508 A1 | 8/2006 | Fuselier et al. | |
| 2006/0217111 A1* | 9/2006 | Marolia et al. | 455/418 |
| 2006/0236325 A1* | 10/2006 | Rao et al. | 719/315 |
| 2008/0108322 A1* | 5/2008 | Upp | 455/411 |

FOREIGN PATENT DOCUMENTS

| | | |
|---|---|---|
| WO | WO 2005/020027 | 3/2005 |

OTHER PUBLICATIONS

International Search Report and Written Opinion from International Application No. PCT/US2008/053586, dated Aug. 11, 2008.

3rd Generation Partnership Project, "Stage 1 Service Requirement for the 3GPP Generic User Profile (GUP)," Release 6, Sep. 2002.

U.S. Appl. No. 11/672,787, filed Feb. 8, 2007 entitled "Supporting Multiple Authentication Technologies of Devices Connecting to a Wireless Network".

U.S. Appl. No. 11/671,247, filed Feb. 5, 2007 entitled "Global WiMax Device Registry".

* cited by examiner

```
<?xml version="1.0" ?>

<!DOCTYPE device_config [
    <!ELEMENT mac_address (#PCDATA)>
    <!ELEMENT device_type (#PCDATA)>
    <!ELEMENT device_info EMPTY>
    <!ATTLIST device_info manufacturer CDATA #REQUIRED
              model_number CDATA #REQUIRED
              serial_number CDATA #REQUIRED>
    <!ELEMENT software (#PCDATA)>
    <!ELEMENT screen_type (#PCDATA)>
    <!ELEMENT screen_size (#PCDATA)>
    <!ELEMENT keyboard (#PCDATA)>
    <!ELEMENT AnyThing (#PCDATA)>
]>

<device_config>
    <mac_address>3F0052E82B18</mac_address>
    <device_type>laptop</device_type>
    <device_info
        manufacturer="acme"
        model_number="tx1000"
        serial_number="000783428445246">
    </device_info>
    <software>winxpsp2</software>
    <screen_type>laptop</screen_type>
    <screen_size>Large</screen_size>
    <keyboard>qwerty</keyboard>
    <AnyThing>Widget</AnyThing>
</device_config>
```

FIG. 2

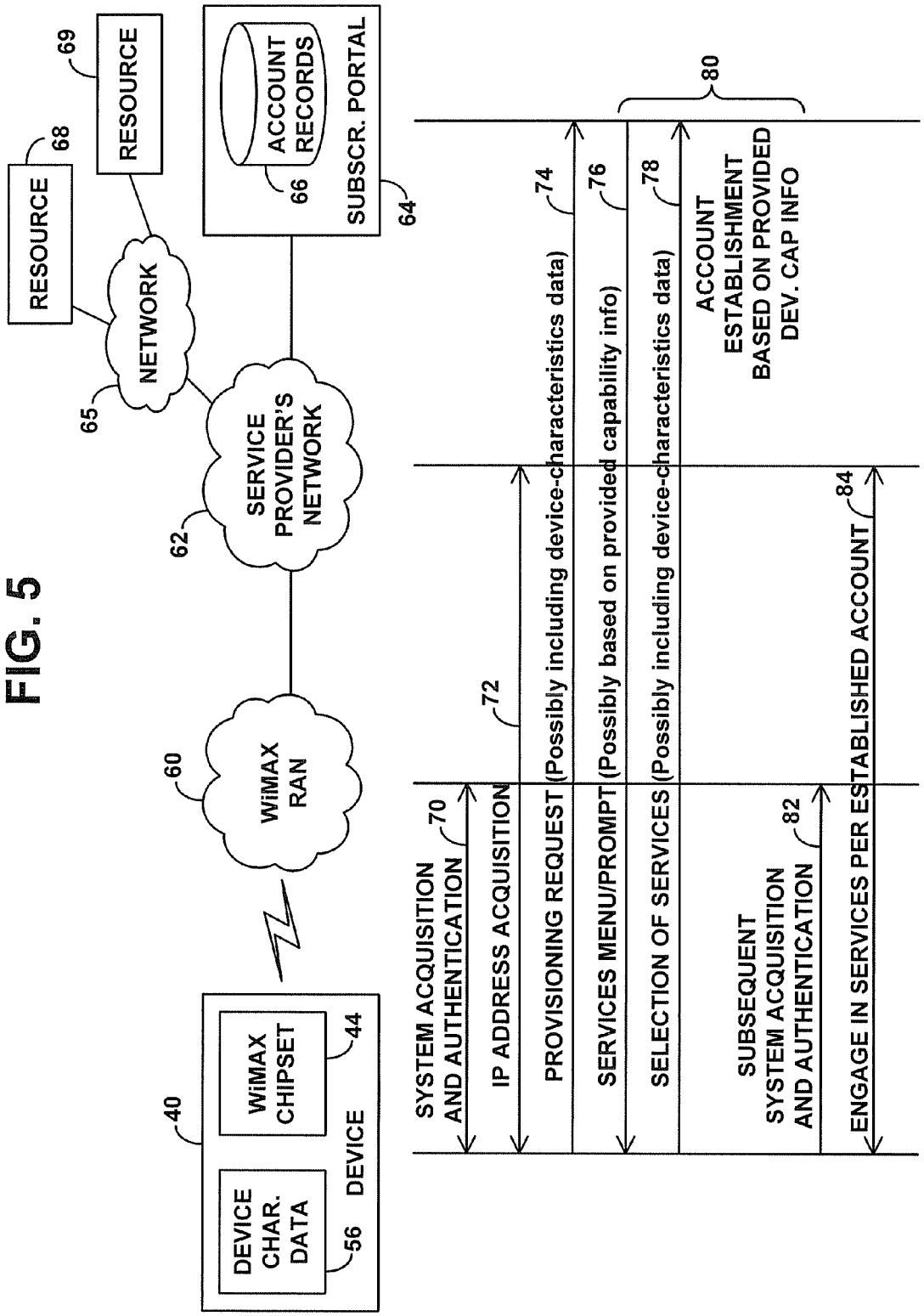

METHOD AND SYSTEM FOR TAILORING DEVICE PROVISIONING BASED ON DEVICE CAPABILITY INFORMATION COMMUNICATED TO NETWORK

FIELD OF THE INVENTION

The present invention relates to telecommunications and, more particularly, to provisioning of wireless communication devices. The invention is particularly applicable in the initial provisioning of devices having embedded WiMax chipsets, but the invention may have broader applicability as well.

BACKGROUND

The widespread growth in popularity of wireless communications has given rise to a commensurate growth in the number of end-user devices that are equipped with wireless communication functionality. Once limited to cellular telephones and pagers, the industry has now expanded to provide wireless communication functionality in many other types of devices as well, including, for example, notebook computers, personal digital assistants, cameras, media players, vending machines, automobiles, parking meters, factory equipment, and household appliances, among others.

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, and provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security.

Current industry plans call for a WiMAX forum to test and certify WiMAX chipsets and for chipset manufacturers to include on each chipset a digital certificate such as an X.509 certificate in accordance with International Telecommunications Union (ITU) recommendations. It is anticipated that manufacturers of such chipsets will then sell the certified chipsets to device manufacturers, who will then embed the chipsets in end-user devices so as to enable the devices to engage in wireless communication.

When a user buys a WiMAX-equipped device and first powers up the device, the WiMAX chipset will search for a signal from a service provider's WiMAX base station and, upon finding the signal, will then engage in an authentication process. In particular, the chipset will transmit its X.509 certificate to the base station and may then engage in back and forth communication with the base station to facilitate validation of the chipset. If the base station successfully authenticates the chipset, the base station will then allow the chipset to engage in higher level communication with the network.

A problem that the present inventors have discovered with this arrangement is that it does not allow the service provider to determine the type and capabilities of device in which the WiMAX chipset is embedded. The X.509 certification process merely allows the service provider to authenticate the WiMAX chipset, so as to determine that the chipset is a valid WiMAX chipset. However, the act of authenticating the WiMAX chipset does not provide the service provider with any useful information about the device in which the chipset is embedded, such as an indication of what type of device it is (e.g., an MP3 player, a camera, a notebook computer, a dishwasher, or the like) and what its features and capabilities are.

Consequently, the service provider would be unable to provide the device with communication service specifically tailored to (or appropriate for) the particular device, and the service provider would similarly be unable to provision the device with application logic and other data tailored to the particular device.

One possible solution to this problem is to have the service provider, or some central authority, maintain a profile database that correlates each WiMAX chipset's X.509 certificate or other device identifier with the type/capabilities of the device in which the chipset is embedded. That way, when the service provider receives the chipset's X.509 certificate, the service provider can not only authenticate the chipset but can also query the profile database to determine the type and capabilities of the device in which the chipset is embedded.

A problem with this solution when it comes to initial service provisioning of WiMAX devices, however, is that the solution would require establishment and maintenance of the profile database in the first place, and then reference to the profile data in practice. Manufacturers of WiMAX-embedded devices would need to populate the profile database with device type/capability data at the time of manufacture, once the WiMAX chipset is embedded in a particular device. Furthermore, the data stored in such a profile database would in theory need to be maintained forever, to facilitate reference to the data whenever the device may be first distributed to an end-user and powered up (e.g., to account for possibly long shelf life before activation). Along those lines, the profile data might also need to be updated to reflect any changes to the device capabilities before the device reaches the end-user (or, in theory, after the end-user obtains the device). Unfortunately, these restrictions could hamper widespread distribution and use of WiMAX-embedded devices.

Another possible solution to the problem is to have a user manually inform the service provider of the type of device and the device capabilities. For instance, the user could call a service provider or could interact with the service provider through a web interface and could provide the service provider with a description of the device that will try to obtain WiMAX connectivity. However, requiring an end user to manually convey this sort of information to a service provider would result in a far more complex and far less seamless experience for the user and could similarly hamper widespread adoption of WiMAX technology.

These and other issues underscore the need for an improvement.

SUMMARY

The present invention provides a method and system for tailoring the service-provisioning of a device based on device capability information conveyed by the device. The invention will be described throughout this document with respect to WiMAX-equipped devices, i.e., devices that are equipped with WiMAX chipsets or other modules that perform WiMAX communication. However, it should be understood the invention may apply more generally to any devices that are equipped with wireless communication technology.

In accordance with an exemplary embodiment of the invention, before (or, in theory, after) a WiMAX-equipped device is distributed to an end-user, the manufacturer or distributor of the WiMAX-equipped device will record in the device a set of data that describes characteristics (e.g., type, features, and limitations) of the device. When the end-user powers on the device or otherwise brings the device within the coverage of a service provider's WiMAX base station, the device will then acquire radio connectivity as described above for instance, with the service provider authenticating the device's WiMAX chipset. Thereafter, the device will then engage in a service-provisioning session with a system operated by the service provider, and during that service-provisioning session, the device will provide the system with its device-characteristics data and the service provider will use that device-characteristics data as a basis to tailor (e.g., customize) provisioning of service for the device and/or to tailor provisioning of the device itself for service.

In one respect, the exemplary embodiment may thus take the form of a method that involves (i) receiving an authentication message over an air interface from a device having a wireless communication module (e.g., a WiMAX chipset) for engaging in communication on the air interface, (ii) after receiving the authentication message, authenticating the wireless communication module, and (iii) after authenticating the wireless communication module, receiving from the device during a first-time activation session with the device a set of data specifying one or more features or capabilities of the device, and using the data as a basis to customize initial provisioning of service for the device, and/or to tailor initial provisioning of the device itself, based on the specified one or more features or capabilities of the device. This method may be carried out by a WiMAX service provider.

In practice, the authentication message may carry an X.509 certificate for the wireless communication module, in which case the act of authenticating the wireless communication module may then involve authenticating the wireless communication module by reference to the X.509 certificate.

Further, the act of receiving the set of data from the device may involve receiving the set of data from the device within a service provisioning request message transmitted from the device. Such a service provisioning request may be an HTTP request message for instance. Moreover, the set of data may comprise an XML file that is stored on the device in advance, such as before the device is distributed to the end-user.

The one or more features or capabilities of the device may comprise one or more user hardware and/or software components of the device, such as one or more user interface components possessed by the device. Other examples of features or capabilities of the device may include (i) a generic type of the device, (ii) one or more user interface components if any possessed by the device, (iii) capability of engaging in one or more particular types of communication, (iv) data storage if any possessed by the device, (v) an operating system if any installed on the device, (vi) one or more media codecs if any supported by the device, and (vii) one or more software applications if any installed on the device.

The exemplary method may also involve, after authenticating the wireless communication module, assigning an IP address to the device for use by the device to engage in data communications, and then engaging in the first-time activation session with the device. Further, the act of engaging in the first-time activation session with the device may involve conducting the initial provisioning of service for the device. For instance, the act may involve correlating a service account with the device, for use in later serving the device. Using the data as a basis to customize the initial provisioning of service for the device based on the specified one or more features or capabilities of the device may then involve (i) using the one or more features or capabilities of the device as a basis to establish one or more service parameters for the service account and/or (ii) using the one or more features or capabilities of the device as a basis to customize a prompt or a mode of communicating a prompt to the device for a user of the device to select one or more services to associate with a service account for the device.

In another respect, the exemplary embodiment may take the form of a method that involves (i) receiving from a WiMAX chip manufacturer a certified WiMAX chipset, (ii) manufacturing a device, including embedding the received WiMAX chipset in the device to enable the device to engage in wireless communication, and (iii) storing on the device set of device-characteristics data describing one or more features or capabilities of the device, and programming the device to report the stored data to a network during first-time activation of the device so as to facilitate customized initial service provisioning of the device based on the one or more features and capabilities. Such a method may further involve distributing to an end-user the device having the embedded WiMAX chipset and the stored set of device-characteristics data.

Yet further, in another respect, the exemplary embodiment may take the form of a device having an embedded WiMAX chipset and a stored set of device-characteristics data indicating one or more features or capabilities of the device. After the WiMAX chipset of the device detects a WiMAX network signal, the WiMAX chipset sends an authentication request wirelessly to facilitate network authentication of the WiMAX chipset. Further, after network authentication of the WiMAX chipset, the device engages in an activation session with a network system to facilitate provisioning of service for the device and/or initial provisioning of the device for service, and the device transmits to the network system the device-characteristics data to enable the network system to customize the service/device provisioning based on the one or more features or capabilities of the device, such as any of the features and capabilities noted above or others.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 2 is an example of device-characteristic data that can be reported from a WiMAX-equipped device to a provisioning system in accordance with the exemplary embodiment.

FIG. 5 is simplified network block diagram and message flow depicting operation of an exemplary embodiment of the invention.

DETAILED DESCRIPTION

Figure 1:
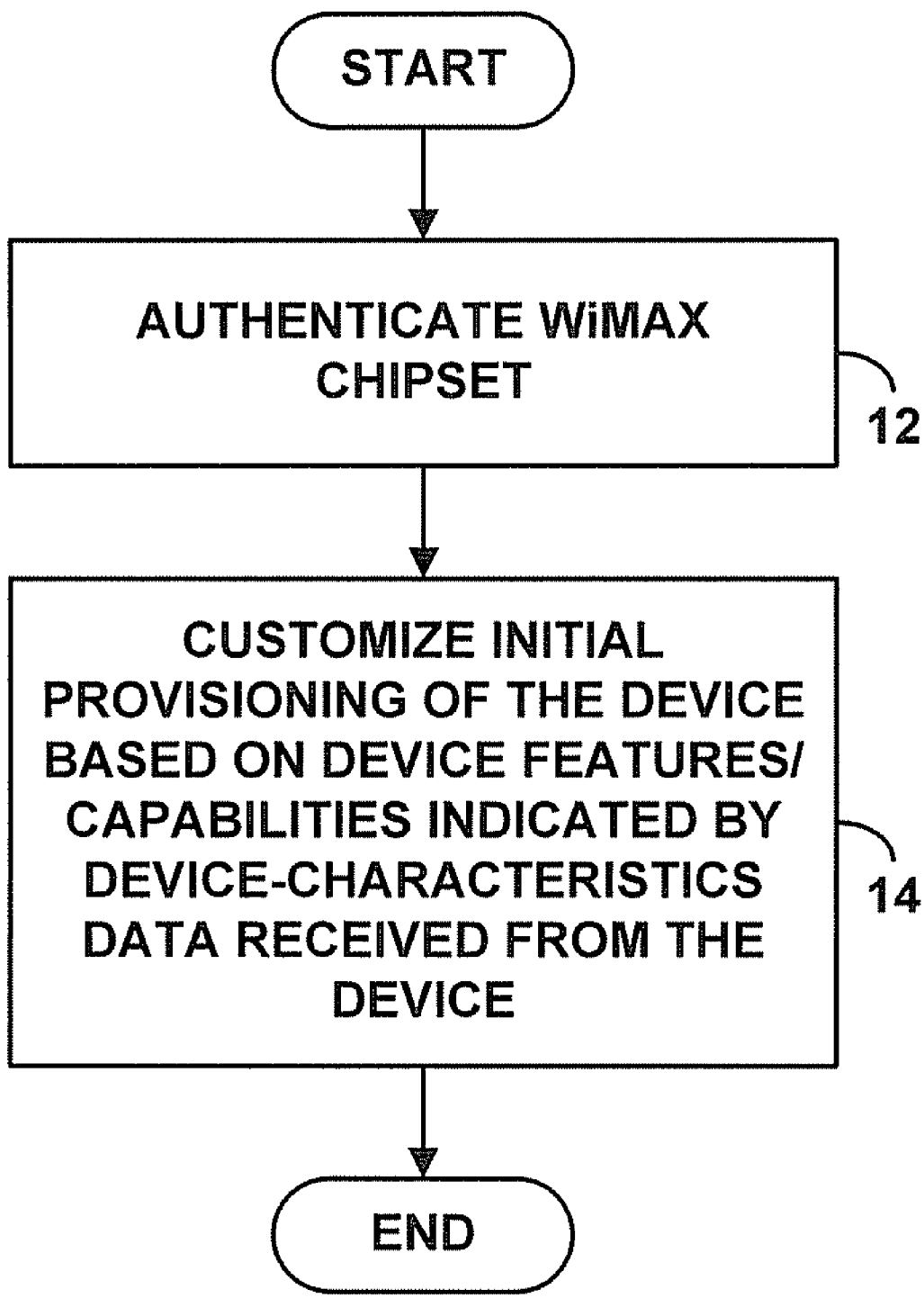
FIG. 1 is a flow chart depicting functions carried out in accordance with an exemplary embodiment of the invention.

In a first principal aspect, an exemplary embodiment of the present invention may take the form of a method for customized provisioning of service for a device, where the device includes a chipset for engaging in wireless communication, and the device further includes a set of device-characteristics data that describes one or more features or capabilities of the device. FIG. 1 is a flow chart generally depicting functions that can be carried out in accordance with the exemplary method.

As shown in FIG. 1, at step 12, a WiMAX service provider first engages in an authentication-session with the chipset and thereby authenticates the chipset and grants the chipset the right to engage in bearer communication. In turn, at step 14, the service provider (or another service providing entity) then engages in a first-time activation/provisioning session with the device, via the chipset, to initially establish a service account for the device. In accordance with the exemplary embodiment, during this activation-session, the service provider will receive from the device the set of device-characteristics data and will customize provisioning of service for the device based on the one or more features or capabilities described by the device-characteristics data. Alternatively or additionally, during this activation-session, the service provider will use the received device-characteristics data as a basis to to establish (e.g., select) configuration data to provision onto the device and will send the configuration data to the device for storage on the device.

The act of engaging in the authentication-session with the chipset preferably involves a service provider's WiMAX base station receiving wirelessly from the chipset an authentication message (such as an Extensible Authentication Protocol (EAP) Identity) that carries the chipset's pre-coded X.509 certificate and MAC address, and the service provider authenticating the chipset by reference to the X.509 certificate in a well known manner. This authentication process functions to determine that the chipset is valid, as a condition to the service provider engaging in further communication with the chipset, i.e., as a condition to the chipset formally acquiring RF connectivity. As such, the authentication process can take other forms as well, perhaps as simple as sending a chipset ID to the network and having the network determine by a database lookup that the ID represents a valid chipset. In any event, successful authentication of the chipset may mean that the service provider has granted or will grant the chipset the right to engage in further RF communication with or through the service provider's network.

As noted above, after successfully authenticating the chipset, the service provider then engages in a first-time activation session with the device, via the chipset. As a general matter, the first-time activation session preferably functions to activate and provision the device for service with the service provider, and particularly to correlate the device with a service account administered by the service provider.

As such, the service account may specify billing information for the device, so that the service provider can bill for providing communication-related services to the device. Thus, during the activation session, the service provider may prompt a user of the device to provide billing information or to otherwise designate billing information that the service provider should associate with the device.

Further, the service account preferably specifies one or more service parameters that define aspects of the communication service that the service provider will or will not provide to the device. For example, the service account may specify types of communication service in which the service provider will allow the device to engage, such as music download service, online photo management service, web browsing service, transcription service, VoIP service, diagnostic service, and other services now known or later developed. As another example, the service account may specify levels of service that the service provider will provide for the device, such as a general class of service (e.g., low, medium, or high) and/or particular quality of service measures (such as bandwidth, power, delay, jitter, or other metrics) that the service provider plans to use when serving the device.

As yet another example, the service account may define access control rules for the device, such as restrictions on network addresses with which the device is allowed to communicate via the service provider's network, and restrictions on types of bearer data that the device is allowed to communicate. And as still another example, the service account may specify resources (e.g., online storage systems, messaging services, etc.) reserved for use by the device. Of course, numerous other service parameters are possible as well The activation session is referred to as a "first-time" activation session because, before the activation session occurs, the device would not yet be correlated with a service account administered by the service provider. In the preferred embodiment, this would happen when the device is first distributed to its first end-user and is thus being used for the first time. However, in an alternative embodiment, this "first-time" activation could happen if the device had been provisioned for service with the service provider but the device's service account was closed, deleted, or otherwise rendered inactive or obsolete, in which case the device may be considered not-yet activated, and so the activation would in effect be a "first-time" activation for the device. Further, analogous functions could also be carried out during subsequent provisioning sessions with the device, i.e., after the first-time activation session.

Note also that the function of initially establishing a service account for the device may or may not involve creating the service account in the first place. It is possible, for instance, that a user or owner of the device may already have a service account with the service provider, covering one or more other devices (also possibly WiMAX-equipped devices). In that case, the function of initially establishing a service account for the device may involve correlating the device with that existing service account, by adding the device as an additional device covered by the service account and designating one or more service parameters for the device (which could differ from the service parameters that the account designates for other devices). Alternatively, it is possible that no such account exists already. In that case, the function of initially establishing a service account for the device may involve creating a new service account (including obtaining user billing information, etc.) and correlating the device with the newly created service account.

The manner in which the service provider engages in the first-time activation session with the device is not critical. One way that the process can occur, for instance, is through data communication between the device and a subscription portal on the service provider's network. To facilitate this data communication, after authentication of the chipset, the chipset may signal to a processor on the device, and the processor may then programmatically request an IP address from the service provider, such as by sending a DHCP request via the chipset (and thus over the air) to the service provider. In response, the service provider may then assign to the device (e.g., in a DHCP reply) an IP address. At this stage, however, the assigned IP address would preferably be a limited-use address, in that the service provider would tunnel all communications from that IP address to the subscription portal, to force communication with the service portal.

In practice, once the device receives such an initial IP address from the service provider, the device may then send an activation request to the subscription portal. The device may automatically send this activation request as an HTTP request message, for instance, and the service provider may tunnel the request to the subscription portal. In turn, the subscription portal may respond to the device with an HTTP reply message, providing the device with an HTML document that, when presented on the device, prompts a user of the device to set up an account with the service provider (or, just the same, to associate the device with an existing account that covers one or more other devices). Through back and forth communication with the subscription portal, a user of the device may thereby establish a service account for the device, so that the device can thereafter engage in service as defined by the account.

In accordance with the exemplary embodiment, as noted above, the method involves receiving device-characteristics data from the device during the activation-session, and using the received device-characteristic data as a basis to customize provisioning of service for the device. This customized provisioning of service for the device may involve selecting, tailoring or otherwise establishing one or more service parameters of the account established for the device in the network and/or selecting, tailoring or otherwise establishing configuration data to provision onto the device itself and then providing the configuration data to the device for storage on the device.

To facilitate this in the first place, as also noted above, the device will contain a set of device-characteristics data that describes one or more characteristics of the device. Preferably, a manufacturer or distributor of the device will record (e.g., write or program) this device-characteristics data into the device at some point before the device is distributed to the end-user, so that the device will be able to retrieve the data and send it to the subscription portal or other designated entity during the activation-session.

The device-characteristics data will describe one or more features or capabilities of the device, so that a service provider who receives the data can use the data as a basis to customize provisioning of service for the device based on the device's features/capabilities. Further, in addition to describing features/capabilities of the device, the device-characteristics data may include one or more identifiers of the device or the chipset, such as a make/model of the device, a MAC address of the chipset embedded in the device, and a serial number of the device, for instance, so that the service provider can correlate the features/capabilities with that identification information, for later reference.

Examples of useful device feature/capability information that can be described by the device-characteristics data include, without limitation, an indication of the generic class of device, an indication that the device does or does not possess particular hardware or software components, descriptions of features of the hardware and/or software that the device possesses, and an indication that the device has or does not have particular capabilities.

For example, the device-characteristics data may specify as a generic class of the device that the device is a personal computer, a cell phone, a camera, a music player, a media player, a refrigerator, a household appliance, an automobile, or some other general device type. As another example, the data may provide a Boolean indication of whether the device possesses certain user-interface components, such as a keyboard, a mouse, a microphone, a loud speaker, a display screen, or the like. As yet another example, the data may provide a Boolean indication or description of whether and to what extent the device is equipped to engage in video communication, audio communication, data communication, messaging communication (e.g., receipt of advertisements, SMS messages, or other messages), and/or other sorts of communication. And as other examples, the data my indicate the type and amount of memory or other data storage that the device possesses, the type of processor the device possesses, the type of operating system installed on the device, the type of media codecs the device supports, and the software applications installed on the device, to the extent applicable. Numerous other examples are possible as well.

Mechanically, the device-characteristics data set can take various forms, as long as it conveys device feature/capability information rather than just specifying a device ID or the like. In a preferred embodiment, for instance, the device-characteristics data set can be structured as an XML, document that describes one or more characteristics of the device using tag-value pairs. FIG. 2 shows an example of such an XML, document, without limitation.

As shown in FIG. 2, the XML document includes a first block that defines various fields and then a second block that provides values for each of the defined fields.

In the example shown, the first field defined by the document is a "mac_address" field, which may specify a MAC address of the WiMAX chipset embedded in the device. A service provider may use this field to cross-reference the device feature/capability information to the WiMAX chipset in the device. That way, when the service provider subsequently serves the device through its WiMAX chipset, the service provider can tailor the service based on the device characteristics corresponding with the chipset's MAC address. In the example shown, the MAC address is provided in hexadecimal format as 3F0052E82B18.

The next field defined by the example document is a "device_type" field, which preferably indicates the generic class of device. In this regard, the term "generic" may have the same meaning as in trademark law, contrasting with the brand (e.g., make/model) of the device. The example shown is "laptop". Other examples, in addition to those noted above, could include "mobile phone", "PDA", "camera", "MP3 player", or the like.

The next few fields of the example document list various identifiers of the device, particularly the manufacturer, model number, and serial number of the device. The document indicates that the device manufacturer is "acme", the device model number is "tx1000", and the device serial number is "000783428445246". These identifiers are examples of information that does not describe features/capabilities of the device but that can be included together with the feature/capability information in the device-characteristics data. As noted above, the service provider can use this identification information to correlate the device with its features/capabilities, for later reference when later serving the device. Although FIG. 2 shows these values as being "REQUIRED," the values could be omitted in practice.

The next field defined by the example document is an example software field, which preferably indicates a type of software installed on the device, such as the operating system or applications running by the device. The example operating system shown is "winxpsp2," meaning Windows XP, service pack 2. Other possible examples could be "Linux", "Mac OS X", "Symbian", or the like.

The next field defined by the document is a "screen_type" field, which preferably indicates a type of display screen possessed by the device. In the example shown, the value of this field is "laptop", indicating that the device possesses a laptop display screen (which would presumably have an understood meaning distinguishing it from other screen types). The following field is then a "screen_size" field, which is shown specifying the size of the display screen as "Large". This field would presumably be omitted if no display type was indicated.

The next field defined by the example document is a "keyboard" field, which preferably indicates a type of keyboard possessed by the device. In the example shown, the value of this field is "qwerty", which indicates that the device possesses a QWERTY keyboard. Other example types of keyboards could be "normal PC keyboard", "phone keypad", and "numeric keypad", for instance. If the device does not possess a keyboard, the value of this field could be "none" or "false", or the field could simply be omitted.

The last field shown in the example document is an "AnyThing" field, which is set forth to illustrate that the device-characteristics data can indicate any other device characteristics in addition to or instead of those shown. In this regard, it should be understood that the particular device features/capabilities that are indicated by the device-characteristics data can be selected based on what is believed to be relevant to a typical service provider. Thus, although a device may have many features and capabilities, the device-characteristic data could describe just a subset of those features and capabilities.

It should be understood of course that many variations from the example XML document shown in FIG. 2 are possible. For instance, although FIG. 2 shows device characteristics being set forth in descriptive ASCII text format, the characteristics could just as well be set forth in some type of coded format that would be understood by the service provider. For instance, if possible display sizes are small, medium, and large, the XML document could be structured to indicate a display size of "small" with the code value 0001, a display size of "medium" with the code value 0010, or a display size of "large" with the code value 0011. Various other examples are possible as well. Furthermore, it should be understood that XML is merely an example mechanism for describing device features/capabilities, and other mechanisms now known or later developed could be used instead or in addition.

In a preferred embodiment, a distributor (e.g., manufacturer) of the device will store the device-characteristics data in the device near the end of the manufacturing process, or at least once the distributor has enough information to establish the characteristics data. For instance, the distributor may write the device-characteristics data to the device once (i) the WiMAX chipset has been incorporated into the device or is at least matched with the device (so that its MAC address can be correlated with the device features/capabilities) and (ii) the relevant characteristics of the device are known.

Figure 3:
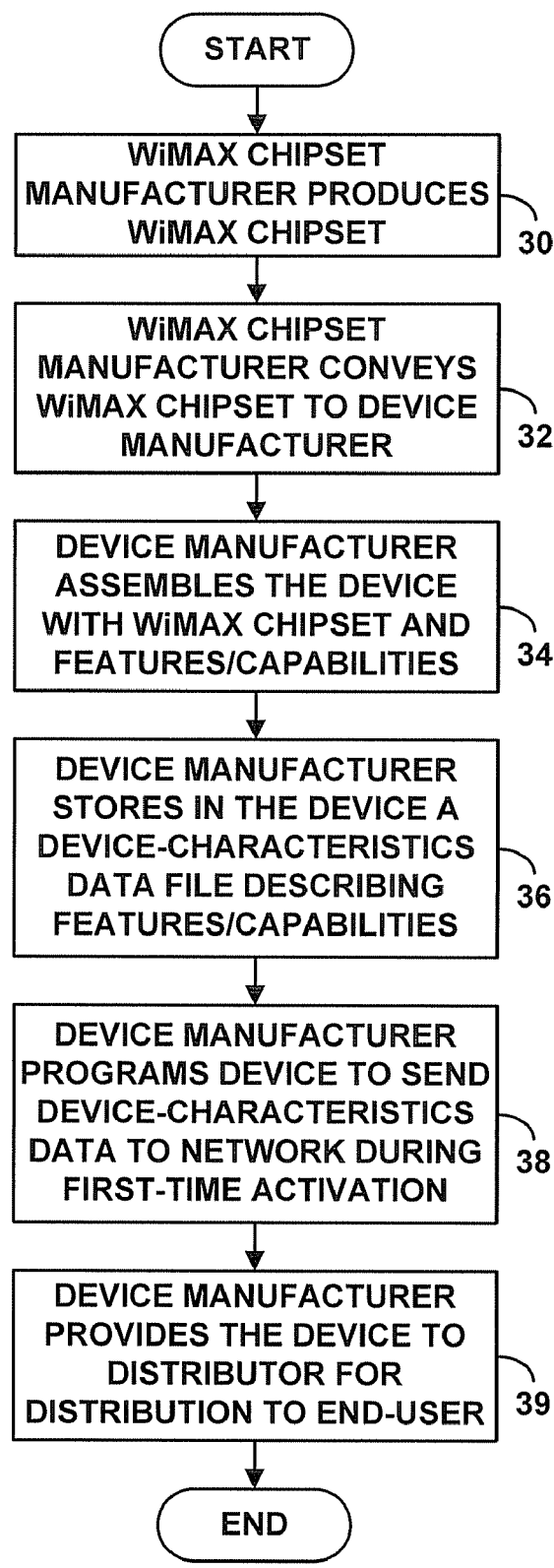
FIG. 3 is a flow chart depicting functions that can be carried out when creating a device for distribution to an end-user in accordance with the exemplary embodiment.

FIG. 3 is a flow chart depicting functions that can be carried out when preparing a device for distribution to the end user in accordance with the exemplary embodiment. As shown in FIG. 3, at block 30, a WiMAX chipset manufacturer produces the WiMAX chipset and includes within the chipset an X.509 certification that can be used later to authenticate the chipset. At block 32, the WiMAX chipset manufacturer then conveys (e.g., sells) the WiMAX chipset to a device manufacturer, if the device manufacturer is a different party.

At block 34, the device manufacturer then assembles the device, including embedding the WiMAX chipset in the device and providing various hardware and/or software components that define particular features/capabilities of the device. At block 36, the device manufacturer then writes into non-volatile memory of the device a device-characteristics data file, such as an XML-form document as discussed above, describing one or more features/capabilities of the device. Furthermore, at block 38, during the manufacturing process, the device manufacturer programs the device to carry out the process of sending the device-characteristics data to the network during first-time activation so as to facilitate customized initial provisioning of service for the device in accordance with the exemplary embodiment. At block 39, the device manufacturer then provides the device to a distributor for distribution to an end-user, if the distributor differs from the device manufacturer. The distributor (or manufacturer) may then distribute the device to an end-user, such as by selling the device at a retail outlet, giving the device to the end-user, or using some other distribution mechanism now known or later developed.

Although the process shown in FIG. 3 shows the device manufacturer writing the device-characteristics data to the device after the WiMAX chipset and various hardware/software components have been included in the device and before conveying the device to a distributor, it should be understood that the device-characteristics data could be written to the device at other times in addition or instead.

For example, the manufacturer could write the device-characteristics data to the device once the manufacturer knows the relevant device characteristics, even before the WiMAX chipset has been incorporated into the device, and perhaps even without indicating anything about the WiMAX chipset (such as the MAC address of the chipset). Thus, in a mass-production of devices all having the same features/capabilities, the manufacturer could incorporate the same device characteristic data by rote into each device. If desired, and if possible (depending on whether the device characteristic data file is modifiable or rather written permanently into the device), the manufacturer or distributor of the device could later add the MAC address of the WiMAX chipset into the data.

As another example, at any point before or after distribution of the device to the end-user, if features/capabilities of the device change (or if otherwise desired) and if the device characteristic data file is modifiable, the file could be modified to indicate the most current set of device features/capabilities. Such modification could occur through cable or wireless connection to the device, in a device service center for instance. Further, if desired and depending on the arrangement of the device, it may be possible for an end-user of the device to write the device-characteristics data to the device or to modify the device-characteristics data in the device.

Figure 4:
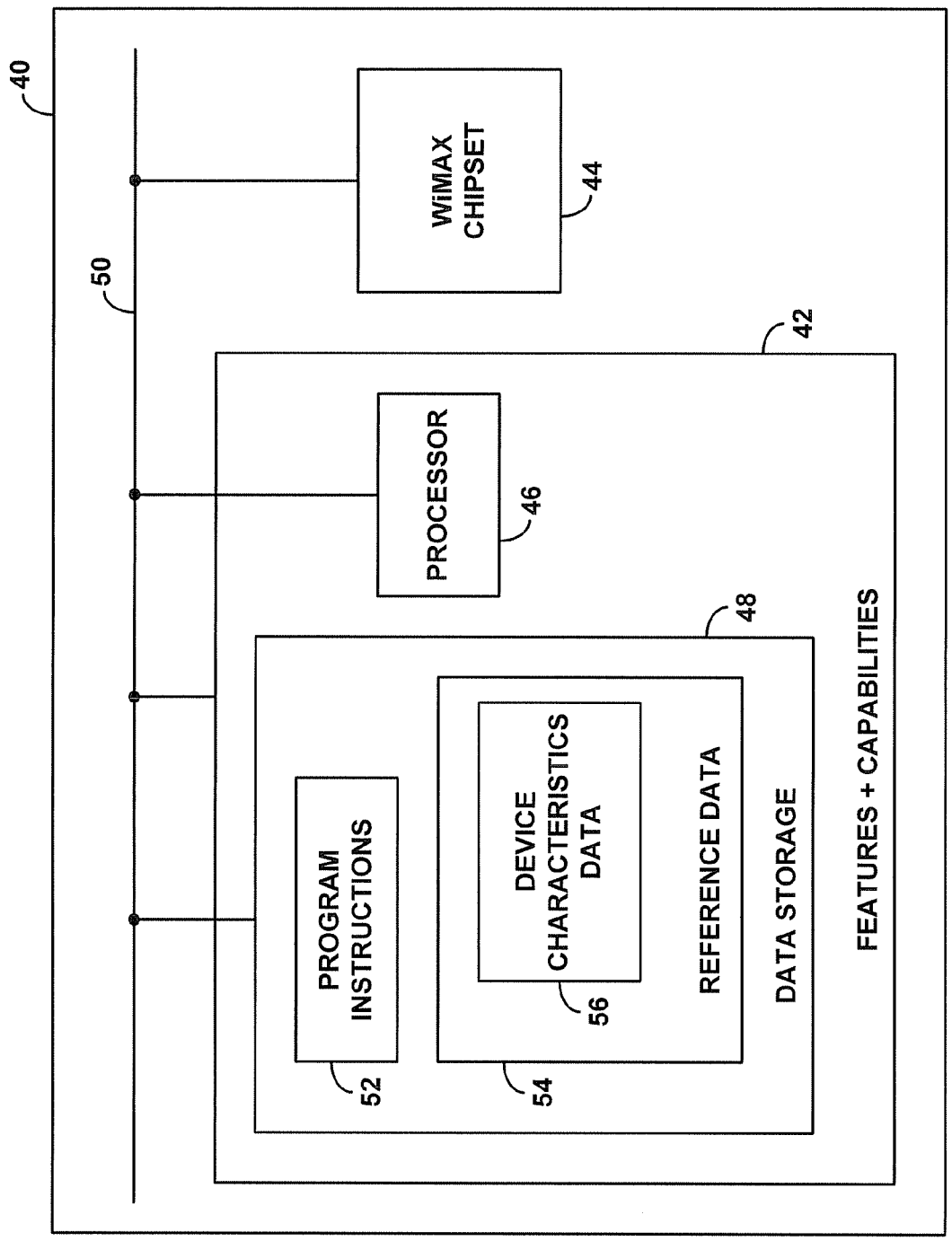
FIG. 4 is simplified block diagram of a device resulting from the process of FIG. 3.

FIG. 4 is next a simplified block diagram of a resulting device 40 that contains an exemplary device-characteristics file and is ready for first use by an end-user. As shown in FIG. 4, the device 40 includes numerous features and capabilities, represented generally by block 42. Further, the device includes a WiMAX chipset, represented by block 44. Among the features and capabilities of the device are preferably a processor 46 and data storage 48. Further, the device may include a system bus or other mechanism 50 that connects the processor 46 with some or all of the features and capabilities 42 and with the data storage 48 and the WiMAX chipset 44.

The processor 46 may comprise one or more processors, such as one or more general purpose processors (e.g., INTEL processors) and/or one or more special purpose processors (e.g., digital signal processors or the like). The data storage 48, in turn, may comprise one or more volatile and/or non-volatile storage components, such as magnetic, optical, or organic storage, and may be integrated in whole or in part with the processor 46.

As further shown, the data storage 48 includes program instructions 52 and reference data 54. The program instructions 52 are executable by the processor 46 to carry out various functions described herein. The reference data 54 comprises data that the processor can reference when executing various program instructions. In the preferred embodiment, the reference data 54 includes a device-characteristics data file 56. Thus, in the preferred embodiment, the manufacturer or distributor of the device will write the device-characteristics data file 56 into data storage 48 in advance of distributing the device to the end-user. The device-characteristics data file 56 will preferably describe one or more features/ capabilities 42 of the device, in the manner discussed above or in some other manner now known or later developed.

Referring next to FIG. 5, a simplified network block diagram and accompanying message flow is provided, to illustrate in greater detail how the invention can operate in practice. As shown in the figure, an exemplary network includes WiMAX-equipped device 40, a WiMAX access service network (ASN) 60, a service provider's network 62, a subscription portal 64, a further network (possibly the Internet) 65, and various resources such as remote clients or servers 68, 69 with which served devices may communicate.

As discussed above, the WiMAX-equipped device 40 includes a WiMAX chipset 44 and a device-characteristics data file 56. The WiMAX ASN 60 then includes a WiMAX base station (BS), which engages in air interface communication with the WiMAX chipset 44 according to well known industry standards. The service provider's network 62 may comprise a packet-switched network owned and operated by the same service provider that owns and operates the WiMAX ASN 60, and preferably functions to provide connectivity between the ASN 60 and other entities. Thus, to the extent permitted by the service provider, device 40, using its WiMAX chipset, may engage in communication service via the ASN 60 and the service provider's network.

Sitting as a node on the service provider's network 62, or otherwise accessible for communication with the network and with device 40, is a subscription portal 64. Subscription portal 64 may comprise one or more computer servers arranged to manage service accounts and provisioning of devices served by the service provider. As such, the subscription portal 64 preferably includes a processor (not shown) and data storage, as well as program instructions stored in the data storage and executable by the processor to carry out various functions described herein.

As shown in the figure, the subscription portal 64 contains account records 66, which may define billing information and service parameters for various devices served by the service provider. Alternatively, rather than storing the account records in the subscription portal 64, the account records 66 could be maintained in another entity and referenced when necessary by the subscription portal 64. It should be understood that the account records data could also be replicated elsewhere in the service provider's network or otherwise arranged so that the ASN 60 and/or other entities in the network can reference the account records data and can serve devices in accordance with the indicated service parameters.

The message flow diagram in FIG. 5 shows functions that can occur in accordance with the exemplary embodiment as a WiMAX device is first provisioned for service. The process preferably begins when a user first powers up the device 40 or brings an already powered-up device 40 within coverage of the WiMAX ASN, at which point the device engages in a system acquisition and authentication routine 70. As discussed above, for instance, the WiMAX chipset in the device may detect a pilot signal or the like being broadcast by the WiMAX ASN 60 and may subsequently send an authentication message, such as an EAP Identity, to the ASN 60. The ASN 60 (or an upstream entity of the service provider's network) may then authenticate the chipset, based on its X.509 certificate, for instance.

At step 72, the device may then acquire a limited-use IP address from the ASN 60 or from the service provider's network 62. For instance, as noted above, the device may send a DHCP request via its WiMAX chipset to the ASN 60, and the ASN 60 may pass the request to a DHCP server (not shown) operated by the service provider. In response, the DHCP server may then assign a limited-use IP address to the device, for use by the device to communicate on the service provider's network, but preferably limiting the device to communication only with subscription portal 64.

At step 74, the device then sends a provisioning (e.g., activation) request to the subscription portal (or to any destination, and the service provider would tunnel to request the subscription portal). As noted above, the provisioning request can be an HTTP request message, assuming the device is configured to engage in HTTP communication, but the request could just as well take some other form. In turn, at step 76, the subscription portal then responds to the device with a service-provisioning prompt, requesting a user of the device to select from a menu of services or service features for instance, and requesting a user of the device to provide billing information to facilitate account establishment. If the initial request was an HTTP request, this prompt could be provided as an HTTP response, which the device could render for presentation to a user. Next, at step 78, upon user interaction (e.g., selection of services and entry of billing information), the device may send a further message to the subscription portal, selecting desired services. This back-and-forth messaging may repeat in this manner as the subscription portal obtains the information that it needs in order to establish a service account for the device, which the subscription portal may record as indicated at step 80.

As shown in the figure, the device may include its device-characteristics data 56 within its initial provisioning request 74 to the subscription portal. For instance, if the device sends the request as an HTTP request message and the device-characteristics data 56 is an XML file, the device may include the XML file in the body of the HTTP request message. Advantageously, conveying the device-characteristics data 56 within the initial provisioning request can allow the service provider to tailor both the form and content of the provisioning process from that point forward based on the indicated features/capabilities of the device.

For example, once the subscription portal receives the provisioning request, it may programmatically read the device-characteristics data 56 and thereby determine that the device does not include a display screen or otherwise does not support graphical user interaction, but that the device does support VoIP interaction. As a result, the subscription portal may then automatically invoke a process to set up a VoIP session with the device (e.g., by signaling with a Session Initiation Protocol address designated by the device-characteristics data), and the subscription portal may then continue the activation session through voice-based interaction with a user of the device (e.g., applying VXML or other voice-based interaction technology).

As another example, by reading the device-characteristics data 56, the subscription portal may determine that the device is a particular type of device and/or that the device does or does not have particular components or support particular functions. Based on this feature/capability information, the subscription portal may then tailor the service-provisioning options that the portal then conveys to the device, as shown in step 76.

For instance, if the device-characteristics data 56 indicates that the device is a media player, the subscription portal may then provide the device with a prompt requesting a user of the device to select one of a plurality of music-servers and video servers from which the user would like the device to download music/video media or associated information in practice. Similarly, if the device-characteristics data 56 indicates that the device is a camera, the subscription portal may then provide the device with a prompt requesting a user of the device to select a photo management service with which the device would interact in practice, such as an online photo storage or distribution service, or a location to which the user would like to have prints sent. Yet similarly, if the device-characteristics data 56 indicates that the device is a refrigerator or other household appliance, the subscription portal may prompt the user to purchase a diagnostic communication service package through which the appliance would communicate maintenance issues via WiMAX to a diagnostics server to facilitate proactive appliance maintenance or the like.

As further shown in the figure, the device may additionally or alternatively convey its device-characteristics data 56 to the subscription portal within another message that the device sends to the subscription portal. For instance, a response (e.g., HTTP response) that the device receives from the subscription portal may include a link to a predefined storage location on the device (e.g., "//local/devchar.xml") where the device-characteristics data 56 would be stored. When a user responds to a prompt defined by that message, the device may then accordingly include its device-characteristics data in a next request message that it sends to the subscription portal. The subscription portal could then use the device-characteristics data to further tailor the service provisioning process based on the device features/capabilities.

For example, if the device-characteristics data 56 indicates that the device has a small display screen, and if the user of the device purchases a subscription package for receiving streaming video to the device, the subscription portal may record as a service parameter in the device's service account an indication that any video delivered to the device should be small-scale video. On the other hand, if the device-characteristics data 56 indicates that the device has a large display screen, the subscription portal may record in the device's account record an indication that any video delivered to the device should be large-scale video. Numerous other examples are possible as well.

Note that, in this provisioning process, the device may provide the subscription portal with the entire set of device-characteristics data 56 or may alternatively provide the server with just a subset of the data. Program logic on the device may indicate what portions of the device-characteristics data to provide.

Also note that many variations from the process shown and described are possible. For example, rather than engaging in any back-and-forth communication with a user of the device, the process can more simply involve the device conveying its device-characteristics data to the service provider, and the service provider setting up a service account for the device based on one or more features/capabilities indicated by the device-characteristics data. This arrangement could work well in a scenario where billing will not be required and particularly in a scenario where the device does not allow for any user interaction with a subscription portal. For instance, a service provider may detect that the device is a personal computer and may automatically provision the device for advertising-based service, where each time the service provider sends a communication to the device the service provider embeds an advertisement in the communication, to pay for the communication service.

As another example, note that the device could provide its device-characteristics data to the service provider in other ways than those shown in FIG. 5, still to facilitate customized service provisioning based on the device features/capabilities. For instance, the device could provide its device-characteristics data 56 to the service provider during the process of authenticating the WiMAX chipset. In particular, when the device sends an EAP Identity or other authentication message to facilitate authentication of its WiMAX chipset, the device can include its device-characteristics data 56 within that message. Ideally, the service provider would then pass this data along to the subscription portal or otherwise make it available for reference by the subscription portal, so that the subscription portal can tailor device provisioning based on the device-characteristics data.

The last two steps shown in FIG. 5 illustrate functions that may occur subsequently, after the device has been provisioned for service in accordance with the exemplary embodiment. As shown at step 82, the device may once again engage in a system acquisition and authentication process. Thereafter, at step 84, the service provider then preferably provides the device with service in accordance with one or more service parameters established through the inventive process.

Furthermore, although FIG. 5 depicts the process of initially setting up a service account for a WiMAX device based on its conveyed device-characteristics data, the invention can also (or alternatively) involve provisioning data onto a WiMAX device based on its conveyed device-characteristics data, as noted above.

For instance, during the first-time activation/provisioning session, the device can send its device-characteristics data to the service provider as described above, thereby giving the service provider an understanding of the device's type/features/capabilities. Based on that information, the service provider can then select or otherwise establish an appropriate set of configuration data to provision onto the device itself. By way of example, the service provider could perform a database lookup keyed to the provided device type/feature/capability information and can thereby determine that the device should be provisioned with particular program logic or other data, and the service provider can then send that data to the device (e.g., in an HTTP response message), for the device to store, install, use, or otherwise apply in practice.

Examples of configuration data that the service provider could establish (e.g., select) to provision onto the device, based on the device-characteristics data provided by the device include, without limitation, (i) network addresses of application servers with which the device may need to interact (such as the network address of a photo management server, a media store, or a diagnostic service center, for instance), (ii) one or more security parameters (e.g., encryption keys, security codes, or the like) or identifiers (e.g., user IDs, etc.) usable by the device to facilitate accessing various network resources, (iii) one or more application programs (e.g., messaging programs, media management programs, etc.) executable by the device, e.g., based on the type of operating system the device possesses, (iv) buddy list data or the like, and/or (v) media such as ringtones, themes, or the like, all depending on the particular type/features/capabilities of the device. Other examples are possible as well.

More generally, it should be understood that an exemplary embodiment of the invention has been described above, and that various modifications from the embodiment shown are possible, while remaining within the true spirit and scope of the invention as defined by the claims.

We claim:

1. A method comprising:

a subscription portal receiving an authentication message over an air interface from a device having a wireless communication module for engaging in communication on the air interface;

after receiving the authentication message, the subscription portal authenticating the wireless communication module;

after authenticating the wireless communication module, the subscription portal engaging in a first-time activation session with the device, wherein engaging in the first-time activation session with the device comprises conducting initial provisioning of service for the device, wherein conducting the initial provisioning of service for the device comprises correlating the device with a service account administered by a service provider, for use by the service provider in later serving the device; and the subscription portal receiving from the device during the first-time activation session with the device a set of data specifying one or more features or capabilities of the device, and using the data as a basis to customize the initial provisioning of service for the device based on the specified one or more features or capabilities of the device, wherein using the data as a basis to customize the initial provisioning of service for the device based on the specified one or more features or capabilities of the device comprises using the one or more features or capabilities of the device as a basis to establish one or more service parameters for the service account administered by the service provider, wherein establishing the one or more service parameters for the service account administered by the service provider comprises recording the one or more service parameters in the service account administered by the service provider, for use in later serving the device, and wherein using the data as a basis to customize initial provisioning of service for the device based on the specified one or more features or capabilities of the device comprises, in addition to using the one or more features or capabilities of the device as a basis to establish one or more service parameters for the service account, using the one or more features or capabilities of the device as a basis to establish configuration data to provision on the device, and sending the configuration data to the device for storage on the device.

2. The method of claim 1, wherein the wireless communication module comprises a WiMAX chipset.

3. The method of claim 2, wherein the subscription portal is operated on a network of the service provider.

4. The method of claim 1, wherein the authentication message carries an X.509 certificate for the wireless communication module, and wherein authenticating the wireless communication module comprises authenticating the wireless communication module by reference to the X.509 certificate.

5. The method of claim 1, wherein receiving the set of data from the device comprises receiving the set of data from the device within a service provisioning request message transmitted from the device.

6. The method of claim 5, wherein the service provisioning request message comprises an HTTP request message requesting service provisioning.

7. The method of claim 1, wherein the set of data comprises an XML file stored on the device in advance.

8. The method of claim 7, wherein the device is operated by an end-user, and wherein the XML file was written to the device before distribution of the device to the end-user.

9. The method of claim 1, wherein the one or more features or capabilities of the device comprise one or more user interface components possessed by the device.

10. The method of claim 1, wherein the one or more features or capabilities of the device comprise at least one of (i) one or more hardware components of the device and (ii) one or more software components of the device.

11. The method of claim 1, wherein the one or more features or capabilities of the device comprise at least one of (i) a generic type of the device, (ii) one or more user interface components if any possessed by the device, (iii) capability of engaging in one or more particular types of communication, (iv) data storage if any possessed by the device, (v) an operating system if any installed on the device, (vi) one or more media codecs if any supported by the device, and (vii) one or more software applications if any installed on the device.

12. The method of claim 1, further comprising:
after authenticating the wireless communication module, assigning an IP address to the device.

13. The method of claim 1,
wherein the conducting the initial provisioning of service for the device comprises sending to the device a prompt for a user of the device to select one or more services to associate with the service account for the device, and
wherein using the data as a basis to customize the initial provisioning of service for the device based on the specified one or more features or capabilities of the device comprises using the one or more features or capabilities of the device as a basis to customize the prompt.

14. The method of claim 13, wherein using the one or more features or capabilities of the device as a basis to customize the prompt comprises:
the subscription portal selecting a mode of communication with the device based on the one or more features or capabilities; and
using the selected mode of communication to send the prompt to the device.

15. The method of claim 14, wherein the mode comprises VoIP.

16. The method of claim 1, wherein the configuration data comprises logic or data selected from the group consisting of (i) at least one application server network address, (ii) at least one identifier or security parameter usable to facilitate access to a network resource, (iii) program logic, (iv) buddy list data, and (v) media.

* * * * *